United States Patent [19]

Gay et al.

[11] Patent Number: 5,102,728

[45] Date of Patent: Apr. 7, 1992

[54] METHOD AND COMPOSITION FOR COATING MAT AND ARTICLES PRODUCED THEREWITH

[75] Inventors: William M. Gay; Robert H. Blanpied, both of Meridian; Philip W. Bush, Laurel; Richard L. Donald; James L. Williams, both of Meridian; James H. Williams, Little Rock, all of Miss.

[73] Assignee: Atlas Roofing Corporation, Meridian, Miss.

[21] Appl. No.: 658,523

[22] Filed: Feb. 21, 1991

Related U.S. Application Data

[63] Continuation-in-part of Ser. No. 616,593, Nov. 21, 1990, which is a continuation-in-part of Ser. No. 568,705, Aug. 17, 1990, Pat. No. 5,001,005.

[51] Int. Cl.$^5$ .................. B32B 17/02; B32B 5/16
[52] U.S. Cl. .................... 428/268; 428/273; 428/283; 428/290; 428/489
[58] Field of Search .............. 428/268, 273, 283, 290, 428/489

[56] References Cited

U.S. PATENT DOCUMENTS 4,459,334  7/1984  Blanpied et al. .................... 428/285
4,618,522  10/1986  Modic ................................ 428/283

Primary Examiner—William J. Van Balen
Attorney, Agent, or Firm—Nixon & Vanderhye

[57] ABSTRACT

A coating composition and method of producing a non-porous mat includes coating a predominantly glass fiber porous web substrate. The coating comprises an aqueous mixture of a mineral pigment; a first binder material comprised of a polymer latex adhesive material; and, a second binder material comprised of asphalt emulsion material. The total dry weight basis of both binders does not exceed 24% of the total coating.

14 Claims, No Drawings

METHOD AND COMPOSITION FOR COATING MAT AND ARTICLES PRODUCED THEREWITH

This application is a continuation-in-part application of U.S. patent application Ser. No. 616,593, filed Nov. 21, 1990, which in turn is a continuation-in-part application of U.S. patent application Ser. No. 568,705, filed Aug. 17, 1990, now U.S. Pat. No. 5,001,005.

BACKGROUND

1. Field of Invention

This invention pertains to a coating composition and a process for coating a porous, substantially glass fiber mat so that the resultant mat can be used as a water resistant underlayment material for the construction industry.

2. Prior Art and Other Considerations

Many forms of weather resistant webbed sheets have been developed for the construction industry as "underlayment" for installation under shingles or siding. Examples of such webbed sheets range from construction papers such as "tar paper", to spun-bonded polyolefin house wraps.

To be effectual for their purposes, the underlayment sheets must satisfy the dual criteria of: (1) maintaining dimensional stability in the varied outdoor climates of the world; and, (2) having a high degree of resistance to penetration by liquid water.

Most of the prior art construction papers have been made using a cellulosic felt or Kraft paper which has been treated with coal tar pitch, asphalt, or pine rosin. The natural tendency of cellulose to swell and expand when wet, and then shrink when dried, has presented a problem in maintaining flatness of these webbed sheets. The swelling and expansion tendencies can yield a curled, wavy, or wrinkled underlayment which is unacceptable for use with light weight siding and shingles.

In an effort to overcome dimensional instability and reduce the fire hazard, glass mats have been substituted for cellulose sheets as the base substrate. Typically, the glass mats have been saturated or coated with various asphaltic materials to reduce porosity.

One example of an asphalt binder-based coating on a glass mat is disclosed in U.S. Pat. No. 4,186,236. While useful as a foam panel facer, the mat of U.S. Pat. No. 4,186,236 did not have the necessary properties to be used as an underlayment. Moreover, the mat disclosed in U.S. Pat. No. 4,186,236 is expensive to fabricate. U.S. Pat. No. 4,186,236 requires a minimum asphalt content of 25% by weight and contends that otherwise it may be difficult to coat the glass mat. Indeed, if asphalt is used as the only binder, more than 25% by weight must be used to effect adequate adhesion.

Historically, when using latex binders as the only adhesive in aqueous coating formulations, a large cost is attendant due to high levels of latex needed. Also, the ratio of filler pigments to the dry weight of the polymer latex cannot exceed certain limits. If this ratio is too high, the pigment will no longer adhere to the substrate to which it has been applied.

In recent years, spun-bonded polyolefin house wraps have gained in popularity as a side wall underlayment. One such product is known as "TYVEK ®", which is a registered trade mark of I.E. DuPont Co. The spun-bonded wraps will not curl, wrinkle, or shrink, and thus are desirable for use under light weight siding. These products, however, are limited in use as they are both expensive and present a fire hazard. They are not suitable as a shingle underlayment.

Accordingly, prior art commercially-produced mats comprise fibers (glass, cellulose, or plastic) used with a high percentage of polymer latex, or else a high percentage of asphalt, to form a water barrier as well as acting as the binder for the mineral pigment fillers. Heretofore it was thought that either latex or asphalt alone should be used as the binder material and water barrier material. Accordingly, it is an object of the present invention to provide a coating composition and method for coating a porous mat whereby the mat becomes substantially non-porous.

An advantage of the present invention is the provision of a dimensionally stable, water penetration resistant, webbed mat using less organic binder material than previously thought possible; and a process for obtaining the same.

Another advantage of the present invention is the provision of an economical and water resistant coating composition which does not get tacky when heated.

An advantage of the present invention is the provision of a novel combination of binders which provide an extraordinarily high degree of water resistance and adhesion for such a low level of hydrophobic organic materials added.

Another advantage of the present invention is the provision of a reduced porosity, predominately glass fiber mat, void of micro-fibers or fibrous glass dust, which are considered inhalation hazards.

Another advantage of the present invention is the provision of a predominately glass fiber mat which provides a safety feature of reduced combustibility.

Yet another advantage of the present invention is that the novel coating material used to lower porosity provides a mat which is smoother to the touch than a mat made of 100% glass.

A yet further advantage is that the novel binder combination and fillers provide an economical mat at the same time the porosity and the surface texture is improved.

SUMMARY

A coating composition and method of producing a water impermeable mat includes coating a predominantly glass fiber porous web substrate. The coating comprises an aqueous mixture of a mineral pigment; a first binder material comprised of an emulsion of a polymer latex adhesive material in water; and, a second binder material comprised of an emulsion of asphalt in water. The total dry weight basis of both binders does not exceed 24% of the total coating.

DETAILED DESCRIPTION OF THE INVENTION

U.S. patent application Ser. No. 07/568,705, filed Aug. 17, 1990, now U.S. Pat. No. 5,001,005, incorporated herein by reference, discloses thermosetting plastic foam laminates which comprise at least one planar facing sheet and a rigid foam integrally attached upon formation of the foam to a surface of a facing sheet. The rigid foam is formed from any thermosetting catalyzed plastic reaction product capable of being foamed. The planar facing sheets includes (A) from 60% to 90% by weight glass fibers exclusive of glass micro-fibers, and (B) from 10% to 40% by weight non-glass filler material, and (C) from 1% to 30% by weight non-asphaltic binder material which bonds the fibers together and bonds the filler materials to the fibers.

U.S. patent application Ser. No. 07/616,593, filed Nov. 21, 1990, and incorporated herein by reference, discloses a method of producing a non-porous mat including the step of coating a predominantly glass fiber porous web substrate. The coating comprises an aqueous mixture of a mineral pigment; a first binder material comprised of a polymer latex adhesive material; and, a second binder material comprised of an inorganic adhesive material. On a dry weight basis, the first binder material comprises no more than 5.0% by weight, and the second binder material at least 0.5% by weight, of the total weight of the coating. The second binder preferably comprises an inorganic compound such as calcium oxide, calcium silicate, calcium sulfate, magnesium oxychloride, magnesium oxysulfate, or aluminum hydroxide. In one mode, the second binder is included in the mineral pigment, as in the cases wherein the mineral pigment includes aluminum trihydrate, calcium carbonate, calcium sulfate, magnesium oxide, and some clays and sands. A method of using the coated mat to produce a thermosetting plastic foam laminate panel is also disclosed. The present invention starts with ordinary, but highly porous, glass fiber mats as the base substrate upon which a novel coating mixture is applied to create a liquid penetration resistant mat.

The coating method of the present invention yields a liquid impermeable mat by coating a predominantly glass fiber porous web substrate. The coating mixture comprises an aqueous mixture of a mineral pigment; a first binder material comprised of a polymer latex adhesive material; and, a second binder material comprised of an emulsion of asphalt. The total dry weight basis of both binders does not exceed 24% of the total coating.

Examples of filler materials useful in the novel coating mixtures of this invention include, but are not limited to: ground limestone (calcium carbonate), clay, dolomiteg bentonite, diatomaceous earth, mica, talc, gypsum (calcium sulfate), aluminum trihydrate (ATH), antimony oxide, magnesium oxide, or a combination of any two or more of these substances. To be an effective filler for a coating of this invention, the pigment should have a particle size such that at least 95% of the filler passes a 325 mesh wire screen. They are collectively and individually referred to as "fillers" herein.

Some fillers include a certain amount of binder and are also advantageously flame suppressants. For example, aluminum hydroxide naturally occurs in the filler aluminum trihydrate (ATH). Aluminum hydroxide is both a binder and flame suppressant. Also in this category are calcium sulfate (gypsum) and the oxychloride and oxysulfate of magnesium. These compounds carry molecules of water bound into their molecular structure (water of crystallization) which are released upon sufficient heating, actually suppressing flames.

Examples of polymer latex binders used with the asphalt emulsion binders are, but are not limited to: Styrene-Butadiene-Rubber (SBR), Styrene-Butadiene-Styrene (SBS), Ethylene-Vinyl-Chloride (EVCl), Poly-Vinylidene-Chloride (PVdC), modified Poly-Vinyl-Chloride (PVC), Poly-Vinyl-Alcohol (PVOH), Ethylene-Vinyl-Acetate (EVA), and Poly-Vinyl-Acetate (PVA). Examples of asphalt emulsion binders used with the polymer latex binders are, but are not limited to: Monsey Product's 50%, Southland Oil Company's 60%, or those made by Atlas Roofing Products using a ratio of 45/55 of ICI Specialty Chemicals' BRIJ® 72-to-BRIJ® 76, or 3:1 ratio of G-3300-to-G-1096 with 40% asphalt, 50% water, and 10% emulsifier; or, a 50% asphalt/40% water/10% bentonite clay, with or without added emulsifier.

Typically, but not exclusively, the glass fiber mats used as the base substrate of this invention are wet-formed into a continuous non-woven web of any workable width on a Fourdrinier machine. Preferably, an upwardly inclining wire having several linear feet of very dilute stock lay-down, followed by several linear feet of high vacuum water removal, is used. Advantageously, the present invention can use, as the base substrate, glass fiber mats having a porosity (liquid and gas) which is too high to be used alone as an underlayment. Various examples of types of glass mat substrates suitable for use with the present invention are provided below.

GLASS MAT SUBSTRATES

Glass Mat Substrate Example No. 1

In the course of normal production, glass mat producers sometimes make "off-specification" rolls which are not usable as recycled raw glass fiber because of contamination with the mat binder. The urea, or phenol-formaldehyde (or other) resin used can cause problems in the non-woven web forming process. This off-specification glass web can be used as the substrate for the products of this invention. These grades of rejected glass mat include shingle-mat and filter-mat. The porosity of shingle-mat or filter-mat is too high to resist water penetration needed in an underlayment sheet. This sheet comprises a preferred embodiment of this invention due to the low cost and heavy basis weight, which is usually between about 15 and 20 lbs. per 1000 Sq. Ft.

Glass Mat Substrate Example No. 2

In order to eliminate micro-glass fibers, or glass dust, one grade of glass mat is produced using a small percentage of cellulose fibers along with the glass fibers. Since cellulose fibers cost less than glass fibers, this mat can be economically obtained and used as the substrate glass mat of the present invention. Uncoated, this glass-/cellulose combination mat cannot function as an underlayment since it is not resistant to water.

Glass Mat Substrate Example No. 3

One grade of lightweight, highly porous glass mat made on a regular basis is used as a pipe wrap in conjunction with coal tar pitch to protect underground pipes against rust, rodents, and roots. This very porous glass mat is not acceptable as a building underlayment. However, when coated with the low cost, novel coating of this invention, this low cost mat becomes a valuable product as an underlayment.

COATING MIXTURES

The preferred embodiment of the present invention includes the following ingredients in the indicated amounts of material, dry weight basis:

| | |
|---|---|
| asphalt | 1% to 23% |
| polymer latex | 1% to 23% |
| diatomaceous earth | 0% to 40% |
| bentonite | 0% to 50% |
| talc | 0% to 80% |
| dolomite | 0% to 80% |

| -continued | |
|---|---|
| limestone | 0% to 90% | wherein the total binder mixed does not exceed 24% dry weight.

Coating Mixture Example No. 1

A 10,860 pound batch of coating mixture is made by adding 1,300 pounds of water to a mixing tank designed as a high speed, high shear disperser; followed by 50 lbs. of Sokalan PA 30 (sodium poly-acrylate dispersing agent); and 820 lbs. wet basis (389.5 lbs. dry basis) carboxylated SBR latex; 10 lbs. wet basis (5 lbs. dry basis) of 50% caustic; and 860 lbs. wet basis of 60% solids asphalt emulsion. This is well mixed prior to adding 7800 lbs. of 325 mesh ground limestone and 20 lbs. of bentonite clay while mixing on high speed until the pigment filler is well dispersed. This produces a coating mixture having about 80.6% solids, and with a viscosity between about 1800 and about 3000 centipoise (cps).

Coating Mixture Example No. 2

In the Coating Mixture Example No. 1, an EVCl latex is substituted for the SBR latex, and mixed in the same manner.

COATED WEB MATS

Coated Web Mat Example No. 1

The glass mat substrate of Glass Mat Substrate Example No. 1 is coated on a coater apparatus suitable for coating porous glass mats. Due to the high porosity of the glass mats used as substrates in the present invention, the aqueous coating mixture comes through the porous mat. If this wet coating comes in contact with machinery parts which are not properly prepared, the parts will quickly become coated and inoperable. Therefore, the coating binder must be substantially dried or cured prior to allowing it to come in contact with machine parts which are at the ambient temperature. In this example, the Coating Mixture Example No. 1 is added at the rate of from about 15 lbs. per thousand square feet (MSF) dry basis weight up to about 120 lbs. per MSF. The optimum cost versus performance range of coating addition rate is from about 20 to about 30 pounds per MFS.

Coated Web Mat Examples Nos. 2 and 3

The Coating Mixture Example No. 1 is added to the Glass Mat Substrate Examples Nos. 2 and 3 to make coated web mats very similar to Coated Web Mat Example No. 1, except that these have a lower glass weight and a slightly higher cost. The physical performance of all three of these examples is substantially similar.

It will be understood to one skilled in the art that further suitable combinations of coating mixtures with glass mat substrates of the present invention can be made.

Also, it will be understood by one skilled in the art of coating that a highly porous substrate as used within the scope of this invention will allow an aqueous coating mixture to penetrate to the opposite surface of the porous substrate (i.e., the surface not contacted by a coating roll, for example). Furthermore, a wet mixture on both sides of the substrate would inevitably cause a deposit to build up on machinery parts, requiring a considerable amount of clean-up effort. This problem is overcome by drying the coated substrate sufficiently before it comes in contact with any ambient temperature machinery part of the coater.

The particular ultimate application of the mat, environmental constraints and appropriate product certification criteria, such as fire tests, for example, will influence which combinations of substrates, binders, and fillers should be used for the particular application.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of producing a non-porous mat comprising the coating of a predominantly glass fiber porous web substrate with a coating mixture, said coating mixture comprising an aqueous mixture of:
   (1) at least one mineral pigment; and,
   (2) a first binder material comprised of a polymer latex adhesive material; and,
   (3) a second binder material comprised of a water emulsion of asphalt;
   and wherein the total dry weight basis of both binders does not exceed 24% of the total coating.

2. The method of claim 1, wherein said mineral pigment is a filler material chosen from the group consisting of clay, mica, talc, limestone (calcium carbonate), gypsum (calcium sulfate), aluminum trihydrate (ATH), antimony oxide, magnesium oxide, bentonite, dolomite, and diatomaceous earth.

3. The method of claim 2, wherein said filler material has a particle size such that at least 95% thereof passes through a 325 mesh wire screen.

4. The method of claim 1, wherein said polymer latex adhesive material is chosen from the group consisting of Styrene-Butadiene-Rubber (SBR), Styrene-Butadiene-Styrene (SBS), Ethylene-Vinyl-Chloride (EVCl), Poly-Vinylidene-Chloride (PVdC), modified Poly-Vinyl-Chloride (PVC), Poly-Vinyl-Alcohol (PVOH), Ethylene-Vinyl-Acetate (EVA), and Poly-Vinyl-Acetate (PVA).

5. The method of claim 1, further comprising:
   applying said coating mixture to a first surface of said porous mat whereby said coating mixture penetrates to a second surface of said porous mat; and,
   drying said coating mixture.

6. A mat produced by the method of claim 1.
7. A mat produced by the method of claim 2.
8. A mat produced by the method of claim 3.
9. A mat produced by the method of claim 4.
10. A mat produced by the method of claim 5.
11. A coating mixture for coating a predominantly glass fiber porous web substrate with a coating mixture, said coating mixture comprising an aqueous mixture of:
    (1) at least one mineral pigment; and,
    (2) a first binder material comprised of a polymer latex adhesive material; and,
    (3) a second binder material comprised of a water emulsion of asphalt;
    and wherein the total dry weight basis of both binders does not exceed 24% of the total coating.

12. The coating mixture of claim 1, wherein said mineral pigment is a filler material chosen from the group consisting of clay, mica, talc, limestone (calcium carbonate), gypsum (calcium sulfate), aluminum trihydrate (ATH), antimony oxide, magnesium oxide, bentonite, dolomite, and diatomaceous earth.

13. The coating mixture of claim 2, wherein said filler material has a particle size such that at least 95% thereof passes through a 325 mesh wire screen.

14. The coating mixture of claim 1, wherein said polymer latex adhesive material is chosen from the group consisting of Styrene-Butadiene-Rubber (SBR), Styrene-Butadiene-Styrene (SBS), Ethylene-Vinyl-Chloride (EVCl), Poly-Vinylidene-Ethylene-Vinyl-Chloride (PVdC), modified Poly-Vinyl-Chloride (PVC), Poly-Vinyl-Alcohol (PVOH), Ethylene-Vinyl-Acetate (EVA), and Poly-Vinyl-Acetate (PVA).

* * * * *